April 5, 1960  M. J. SIMEONE ET AL  2,931,151
BREAKING ATTACHMENT FOR SLAB GUM WRAPPING MACHINES
Filed Jan. 26, 1959  5 Sheets-Sheet 1

INVENTORS
MARIO J. SIMEONE
EUGENE GLASER
BY
ATTORNEY

April 5, 1960   M. J. SIMEONE ET AL   2,931,151
BREAKING ATTACHMENT FOR SLAB GUM WRAPPING MACHINES
Filed Jan. 26, 1959   5 Sheets-Sheet 2

INVENTORS
MARIO J. SIMEONE
EUGENE GLASER
BY
ATTORNEY

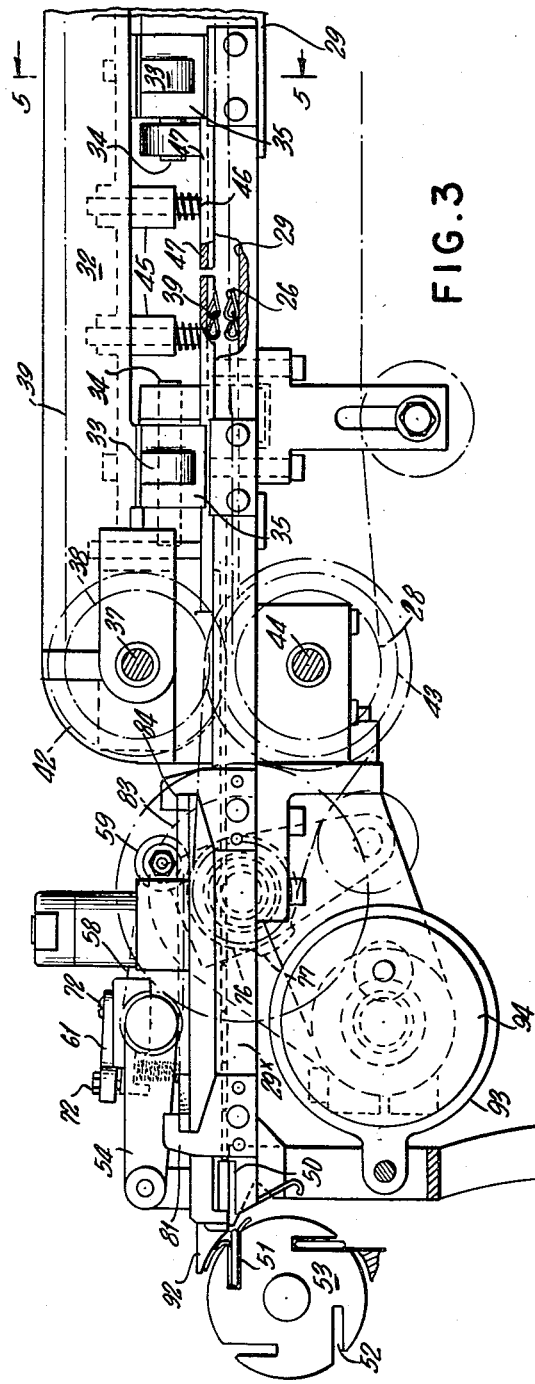
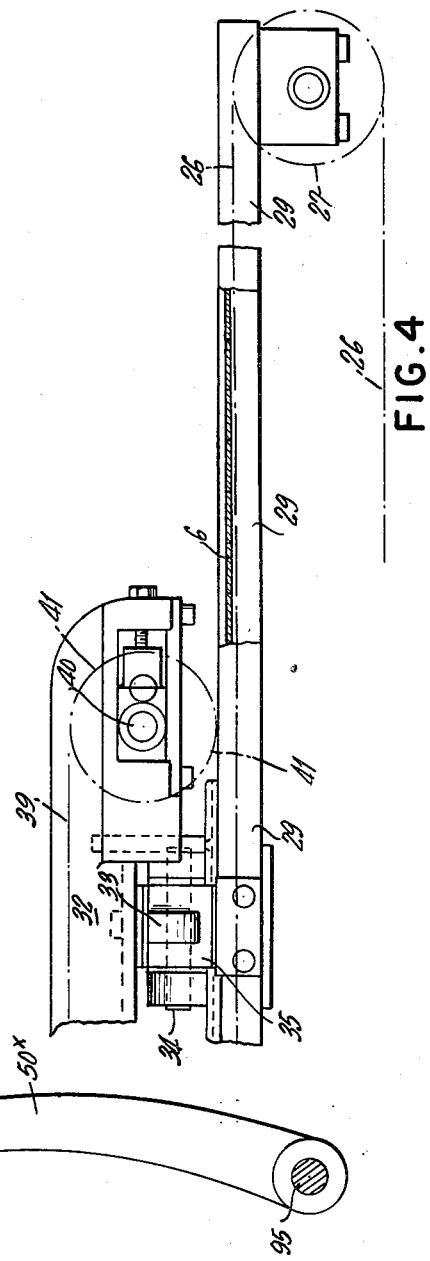

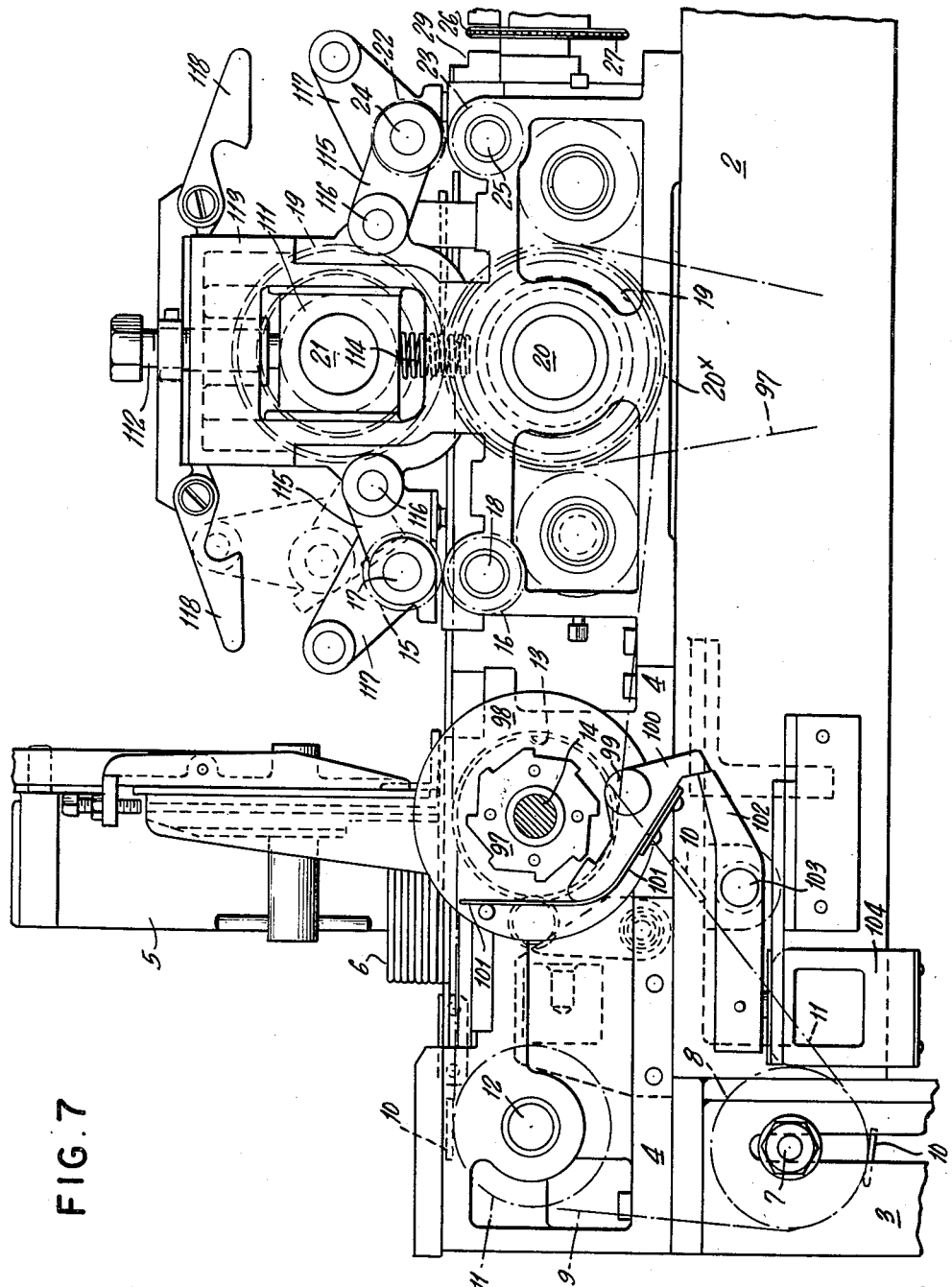

April 5, 1960 M. J. SIMEONE ET AL 2,931,151
BREAKING ATTACHMENT FOR SLAB GUM WRAPPING MACHINES
Filed Jan. 26, 1959 5 Sheets-Sheet 5
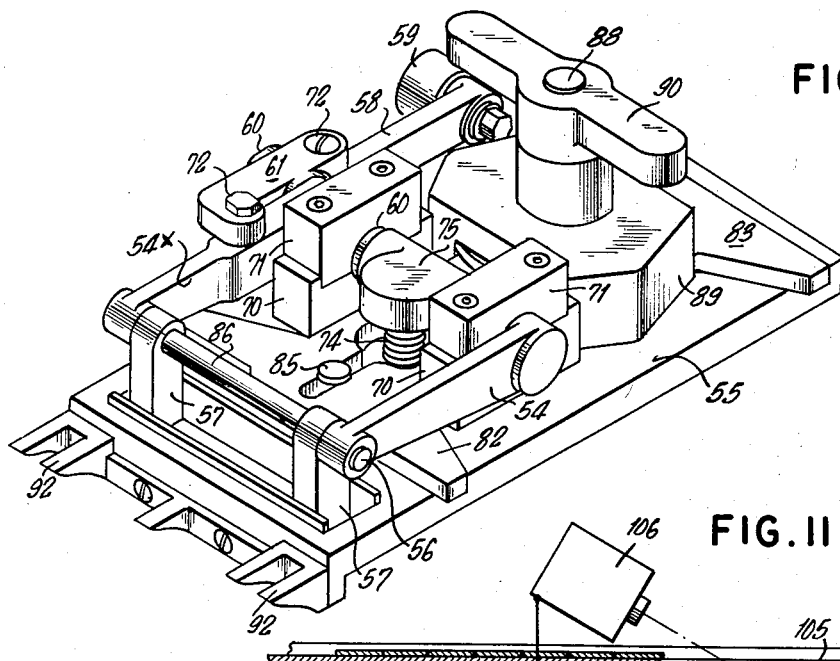
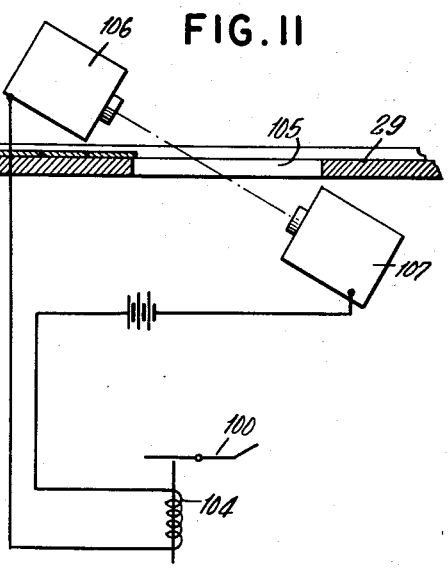
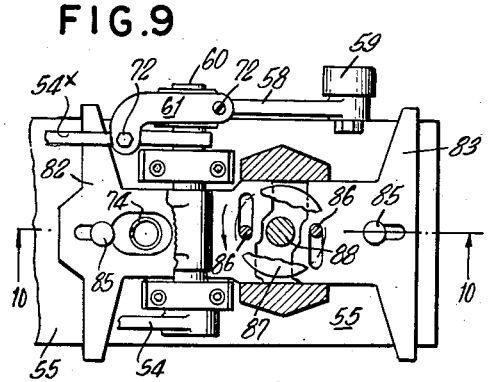
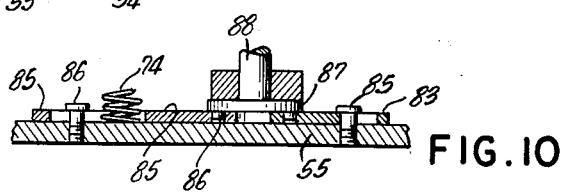
INVENTORS
MARIO J. SIMEONE
EUGENE GLASER
BY
ATTORNEY United States Patent Office 2,931,151
Patented Apr. 5, 1960

2,931,151

BREAKING ATTACHMENT FOR SLAB GUM WRAPPING MACHINES

Mario J. Simeone, Flushing, N.Y., and Eugene Glaser, Philadelphia, Pa., assignors to American Chicle Company, Long Island City, N.Y., a corporation of New Jersey Application January 26, 1959, Serial No. 789,058

8 Claims. (Cl. 53—123)

The object of the invention is to provide a high speed breaking machine acting upon elongated slabs of chewing gum to break the same into individual sticks and to present the sticks successively to the tumble box mechanism of a high speed wrapping machine. Prior to describing the machine, subject of the present invention, its general mode of operation will now be described.

Superimposed slabs of chewing gum are held at the top of the machine and are individually dislodged at the bottom of the stack and are fed between scoring blades. The scored slabs thence are passed upon a pair of lower feed chains. Pressure co-acting feed chains lie at the top of the moving slab, and the latter in its progression passes a point in the feed where the beam of an electric eye assembly is permitted, through electrical connections, to energize a solenoid. The purpose is this: Each slab delivery action which carries a lowermost slab from the stack and to the scoring rolls, is controlled by a clutch which connects a continuously rotating drive shaft, for a single rotation thereof, with a delivery feed for the slab. The clutch is thrown into action by a solenoid which releases a spring-impelled pawl. Thus the rear end of the moving scored slab must pass the electric eye beam in order that the solenoid may be acted upon to throw the clutch into action for a single rotation. The front end of each slab reaches a specially formed breaking assembly adjacent the tumble box of the gum stick wrapping machine. The front end of the slab meets a stop and instantaneously a reciprocating breaker bar, acting vertically in the present embodiment, detaches the forward stick portion, forcing it into register with a throw-in fork of the tumble box assembly and the stick meets a wrapper web and is pushed with a section of the latter into one of the pockets in the tumble box. The aforesaid actions are enabled at such high speed that upwards of 1,200 sticks may be broken from successive slabs in the time of one minute, and so presented to the tumble box.

The invention will be described with reference to the accompanying drawings, in which:

Figs. 3 and 4 are composite views, each partly broken away and showing respectively, in elevation, the feed for the scored slab and the breaker assembly, forwardly and rearwardly thereof.

Fig. 6 is a detailed view in elevation and partly in section, showing the breaker assembly in conjunction with the tumble box and its coacting fork.

Fig. 7 is a view in side elevation showing the slab stack feed assembly and the scoring roll assembly, certain parts being shown on dotted lines.

Fig. 8 is a perspective view of the detachable breaker assembly.

Fig. 9 is a fragmentary view of the structure shown in Fig. 8, broken away to show the latch operating mechanism.

Fig. 10 is a vertical section on the line, 10—10, Fig. 9.

Fig. 11 is a diagrammatic view showing the electric eye circuit leading to the clutch releasing solenoid.

Figure 1:
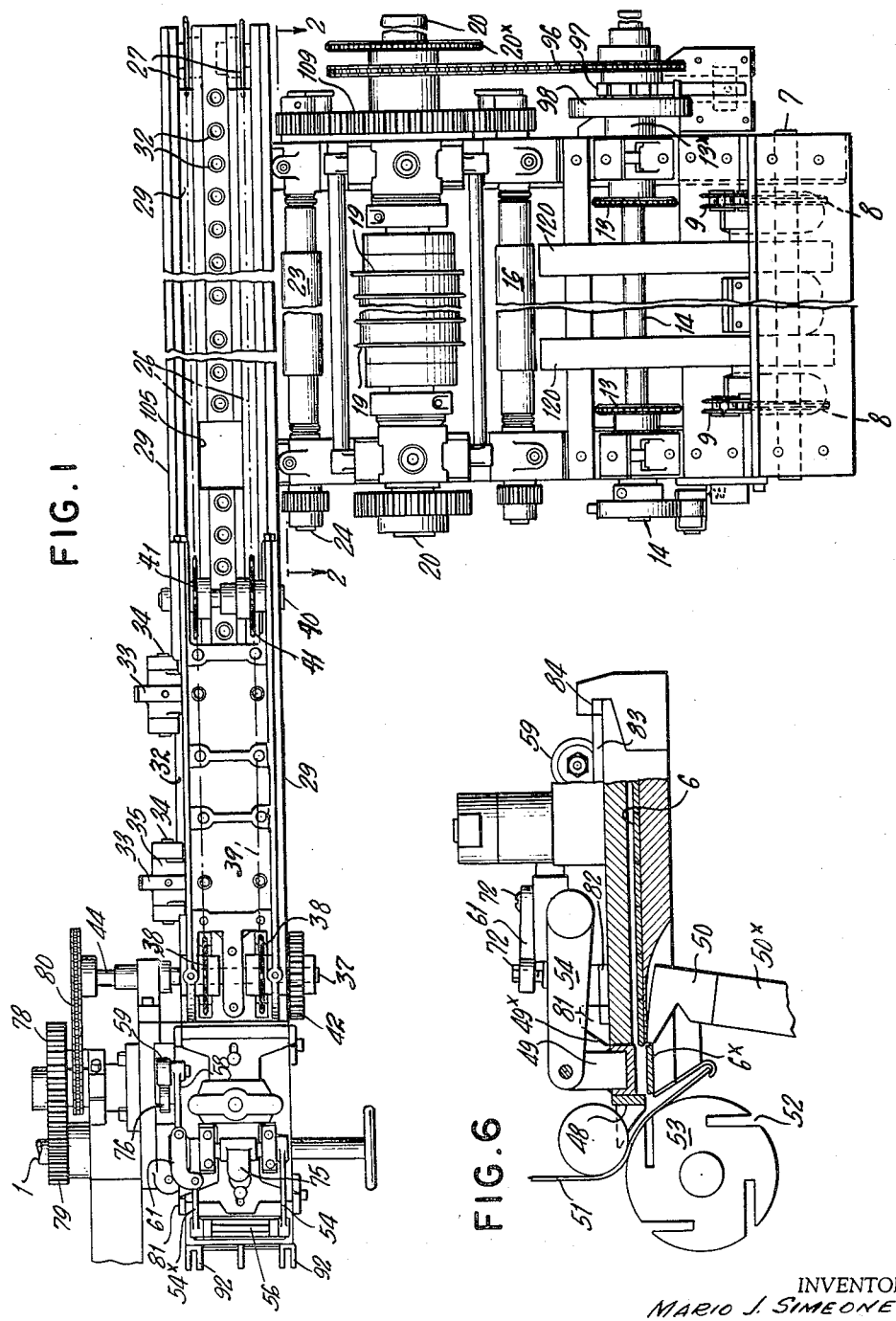
Fig. 1 is a plan view of the machine, showing in dotted lines the path of the feed chains in advance of the breaker assembly and upon which the scored slabs are deposited from the scoring rolls, the forward and overlying feed chains with their carrier and drive having been removed.

A main drive for the breaking machine assembly may be considered as taken from the shaft 1, Fig. 1. The breaking assembly will now be described, beginning with the slab stack and progressing forwardly to the tumble box of the packaging machine. Referring to Figs. 1 and 7, at 2 and 3 are shown supporting members for a frame 4 on which is mounted a box of any suitable construction, indicated at 5, for a stack of chewing gum slabs 6. On support 3 and adjustable in a vertical slot is a shaft 7, which carries a pair of sprockets 8 for feed chains 9. These feed chains carry pusher bars 10, adapted to successively engage lowermost slabs from the stack 6 and to move them forwardly toward the scoring rolls later to be described. From sprockets 8 the chains run over sprockets on a shaft 12, one of the sprockets being indicated at 11, Fig. 7. The chains thence run over sprockets 13 on a shaft 14 for return to sprockets 8.

Each slab projected by the pusher bars 10 is projected between two driven feed rolls 15, 16 on shafts 17, 18, and is fed between spaced annular cutters, 19 on a lower shaft 20 and an upper shaft 21. As the slab leaves the cutters, it passes between two feed rolls 22 and 23, on shafts 24 and 25 and onto a pair of feed chains, of which one is shown at 26, Fig. 7, the pair being indicated by the dotted lines 26, Fig. 1.

The "cutters" indicated at 19 are so spaced vertically as not to cut through the slab, and they are laterally spaced in accordance with the desired width of the sticks of chewing gum finally to be broken from the slab. Thus the slabs may be of a length, for example of 18⅜ inches, the cutters may be spaced ¾ inch, so that the cutters will "score" transversely of the slab to separate 23 "sticks" by what will hereinafter be termed score lines. Such example is merely one which has been employed in commercial operation of the breaking machine and the length of the slab to be acted upon and hence the number of spaced scoring lines may be as desired. A standard width of the slab corresponds to the customary length of a chewing gum stick, so that the stick areas still connected, but scored at their margins, will lie upon the feed chains 26 with their front longer margins facing the tumble box of the wrapping machine, and as later to be described.

Reference to Figures 3 and 4, in conjunction with Fig. 1, will show that the rear lengths of the feed chains 26 run over sprockets 27, and the front lengths run over sprockets 28, and that the upper length of each feed chain 26 is supported by a table-like member 29.

In Fig. 1 the numeral 32 indicates holes or passages for sugar dust from the scored slabs so that it may pass downwardly from the table member 29.

Figure 5:
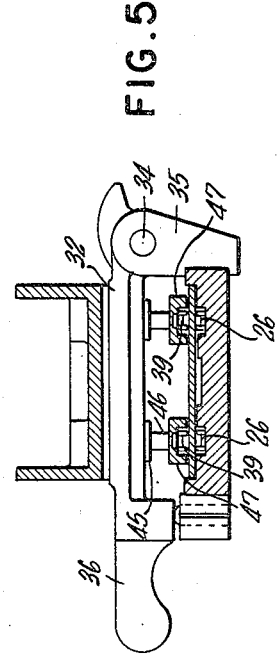
Fig. 5 is a vertical section on the line 5—5, Fig. 3.

Above the table member 29, and extending from the sprockets 28 to the sprockets 31, is a hinged carrier for an overhead pair of feed chains, as best illustrated in Figs. 3 and 4. The carrier is shown at 32 and at one side it is provided with a plurality of hinge lugs which may be of any suitable number. In Figs. 3 and 4, three of said lugs, 33, are shown, although two will be sufficient, as indicated in Fig. 1. These hinge lugs receive hinge pins 34 in bracket arms 35, rising from the table 29. As shown in Fig. 5, the carrier 32 at its side opposite the hinge elements, may be provided with finger lift pieces 36.

At opposite sides of carrier 32, the walls thereof rise vertically to receive near the discharge end of table 29, a shaft 37 carrying sprockets 38 for the overhead feed chains 39. At the opposite end of carrier 32 is a shaft 40 for the co-acting sprockets 41. Sprockets 38 are fixed on shaft 37 and the latter is driven by a gear 42 in mesh with a gear 43 on shaft 44 which carries the lower chain feed sprockets 28.

Depending from carrier 32 are apertured posts 45 which receive studs 46 carried by channeled guides 47 for the upper feed chains 39. As shown in Fig. 3, light coiled springs of minor presure, may engage the guides 39.

In its feed the scored slab meets a stop 48, Fig. 6, and instantly a breaker bar 49 moves downwardly and the stick thus broken comes into register with the packaging machine fork 50. At that moment a web of wrapping material 51 lies in position to receive the stick 6x and the wrapper section is thrown with the stick into a pocket 52 of the tumble box 53.

The breaker bar 49 may have a hardened facing at 49x, and it is pivoted to an oscillating arm 54 at one side of the breaker carrier 55 by means of a pivot shaft 56, the bar having two apertured arms 57 which receive shaft 56. At the side of the carrier 55, opposite arm 54, is a lever arm 58 which carries a roller 59. This lever arm is pivotally mounted on a shaft 60, supported by carrier 55, through two sets of bearing blocks, composed of lower blocks 70 and detachable upper bearing blocks 71. Shaft 56 carries an operating arm 54x which is adjustably connected to lever arm 58 by a bridge piece 61. Thus, arms 54 and 54x may be fixed to shaft 60, whereas arm 58 may be loose on said shaft, its operating connection being the screws or bolts 72, enabling raising or lowering of arms 54 and 54x relatively to lever arm 58 for slight adjustments. For example, when it is desired to adjust the initial position of the breaker bar at the instant of its downward thrust, this may be accomplished by rotating the right hand adjustment screw 72, Fig. 8, although the manner of adjustment may be selected in other known ways as desired.

The breaker bar carrier 55 supports a vertical spring 74 which constantly acts upon an offset arm integral with a sleeve 75 fixed upon shaft 60. The purpose of this spring is to act through the bridge 61 upon lever arm 58 to maintain roller 59 on the periphery of its actuating cam and to quickly lift the breaker bar after each active stroke thereof. The said operating cam is indicated at 76 with its high point at 77, Fig. 3. The cam 76 is on a shaft which receives a gear 78, Fig. 1, in mesh with a gear 79 on shaft 1. The shaft which carries gear 78 also carries a sprocket (not shown) connected by a chain 80 (Fig. 1), connected to a sprocket (not shown) on shaft 44 to drive the lower feed chains.

For driving the upper feed chains, shaft 37, Fig. 3, carries a gear 42 in mesh with gear 43 when the hinged carrier for the upper feed chains is swung down into active position, as in Figs. 3 and 4.

Carrier 55 for the breaker bar is detachable from the extension 29x of the feed table 29. To that end, the table extension 29x carries near one end a pair of hook lugs 81, Figs. 3 and 8, adapted to be entered by a latch bar 82 of carrier 55, and the carrier is provided with a second retractable latch bar 83 adapted to enter hook lugs 84 at the opposite end of the table extension 29x. The latch bars are guided by the walls of slots entered by studs 85 on the carrier 55, and the manner of retraction is as follows. The inner ends of the latch bars are slotted to receive pins 86, Fig. 9, these pins being carried by a disk 87 operated by a shaft 88, the disk and pins being enclosed in a box 89, Fig. 8, the shaft 88 having fixed thereto an operating handle 90.

The carrier 55 is provided with wrapper web deflecting fingers 92.

The fork 50 is reciprocated by any suitable means such as the eccentric sleeve 93, Fig. 3, and cam 94. The arm of the fork is shown at 50x with its pivotal point at 95.

Toothed clutch disk 97 is carried by a sleeve on shaft 14 which sleeve and disk are continuously rotated by chain 96 leading to a sprocket on shaft 20. The feed chain sprockets 13 on shaft 14 are driven through the intermediary of a coacting clutch disk 98, to which is pivoted at 99, Fig. 7, a toothed pawl 100 normally pressed by a spring 101 into engagement with the toothed clutch disk 97. However, the lower end of pawl 100 projects into the path of a detent arm 102 pivoted at 103 and having its outer end in register with a push-up solenoid 104, the action being as follows:

Referring to Fig. 1, it will be seen that feed table 29 is formed with an opening at 105. At 106 and 107 are standard electric beam members controlling a circuit leading to the push-up solenoid 104. When a slab on feed table 29 is progressed to the point where its rear end passes table opening 105, the circuit is closed through the solenoid and detent 102 is moved away from pawl 100, spring 101 snapping the pawl, and hence the coating clutch disk 98, into interlocking engagement with toothed clutch disk 97 for a single rotation of sprockets 13 and feed chains 9. This action is instantaneous with respect to the solenoid. Thus the detent 102 almost immediately moves into the path of the pawl 100 in the single bodily rotation thereof and movement of the feed chains 9 ceases.

By means of the above instrumentalities, successive, and timed, slabs, are passed to the feed rolls 15 and 16 and through the scoring rolls 19, being picked up by the outermost feed rollers 22, 23 and thence deposited upon the feed chains 26 of the feed table.

Means are provided for adjusting the upper scoring roll 108, which is carried by shaft 21. These shafts are connected by deep-cut gears 109, 110, enabling the two sets of cutters 19 to be sufficiently adjusted to vary the degree of scoring of the slabs. For said adjustment, each end of shaft 21 is carried by a bearing block 111, of which one bearing block is shown in Fig. 7. Each bearing block is adjusted by a screw 112 in the usual manner, and in each case the bearing block is slidable in a frame member 113, in the manner shown in Fig. 7, and for each bearing block an underlying coiled spring 114 may be provided if desired.

Figure 2:
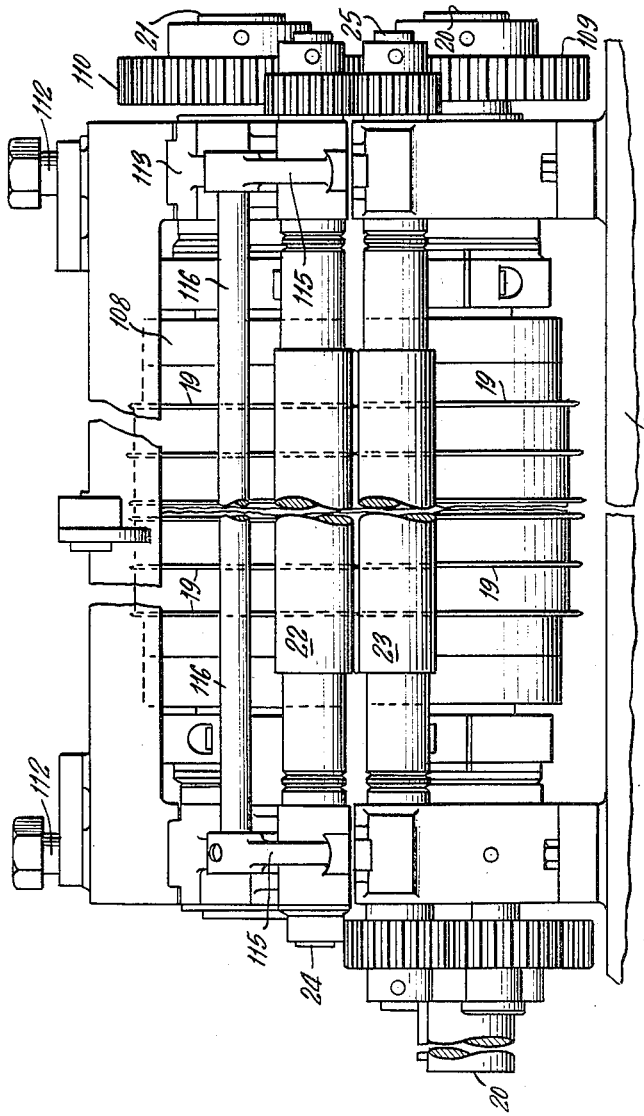
Fig. 2 is a view in elevation, patly broken away and taken on the line 2—2, Fig. 1, in order to show the scoring roll assembly.

Provision is made for lifting and latching the upper feed rolls 15 and 22, Fig. 7. For that purpose the feed rolls are journaled in sleeves carried by arms 115 pivoted at 116. By means of stud carrying links 117, the upper feed rollers 15 and 22, may be raised and held in raised position by latch hooks 118, as indicated in dotted lines, Fig. 7. The said lifting and latching means for the feed rolls 15 and 22 has been omitted from Fig. 2 since the latter figure is largely diagrammatic. As shown in Fig. 1, the slabs discharged from the slab box, slide upon strip plates in their progression to the initial feed rollers 15 and 16, that figure showing only the lowermost of the said initial feed rolls.

It will be understood that various modifications may be made in the form and arrangement of the elements, constituting the illustrated embodiment, without departing from the spirit of the invention.

Thus while we prefer that the slabs be scored, this is not essential because the breaker bar and the table throat may co-act to sever stick areas from an unscored slab. In one form of the invention the cutters may be eliminated and pre-scored slabs employed in the stack. Also, the stack provision may be eliminated and the slabs may be fed by any suitable means in succession to the means for endwise feeding thereof in succession to the breaker bar.

Having described our invention, what we claim and desire to secure by Letters Patent is as follows:

1. Breaking apparatus for chewing gum slabs comprising a frame, means on the frame for receiving and feeding chewing gum slabs endwise thereof, supporting means for the slab in its movement, a throat having a wall associated with said supporting means, a breaker bar reciprocable in said throat, and supporting and actuating means for said breaker bar comprising a rigid carrier, arm means pivotally supported on said carrier, pivotal connections between said arm means and the breaker bar, a lever arm adjustably connected to the arm means and having an end adapted to receive actuating impulses, spring means held by the carrier for retracting the arm means after each active stroke thereof, and latching means for releasably holding the carrier upon the slab supporting means.

2. Breaking apparatus for chewing gum slabs, constructed in accordance with claim 1 and in combination with a wrapping machine tumble box with pockets, wrapper web guides, and pocket-injection means, of wrapper web engaging projections carried by the breaker bar carrier for peripheral association with the tumble box, the carrier being formed with spaced wall surfaces defining a throat, the breaker bar being positioned in said throat for reciprocation, and the breaker bar having active movements synchronized alternatively with the active movements of the tumble box injection means.

3. Breaking apparatus for wrapping machines including a tumble box with pockets, and injection means in register with said pockets, comprising means for holding a stack of chewing gum slabs, means for successively ejecting bottommost slabs from the stack, a first feeding means for receiving and feeding the slabs laterally thereof, a pair of superimposed scoring rolls and means for rotating the same said rolls having registering cutting rings spaced equivalent to the width of chewing gum sticks to be broken from each slab and having combined scoring and feeding action thereon, a second feeding means, transversely of the first said means, for receiving and propelling the slabs endwise in succession, and a reciprocating breaker bar adapted to act upon forward end portions of each slab so propelled and adapted to move said portions away from the slabs so as to bring said portions successively and directly into edgewise register with said tumble box injection means.

4. Breaking apparatus for wrapping machines including a tumble box with pockets, and injection means in register with said pockets, comprising means for holding a stack of chewing gum slabs, means for successively ejecting bottommost slabs from the stack, a first feeding means for receiving and feeding the slabs laterally thereof, a second feeding means, transversely of the first said means, for receiving and propelling the slabs endwise in succession, a reciprocating breaker bar adapted to act upon forward end portions of each slab so propelled and adapted to move said portions away from the slabs so as to bring said portions successively and directly into edgewise register with said tumble box injection means, a support associated with said second feeding means, an aperture in said support at a distance rearwardly from the breaker bar at least equivalent to the length of the slab to be acted upon, and electric circuit including electric eye means adapted to throw a beam through said aperture of the support and thereby close said circuit, a drive for said first feeding means including a clutch, and means for controlling said clutch including a solenoid in said circuit.

5. Breaking apparatus constructed in accordance with claim 3 in combination with a shaft for the uppermost of the superimposed scoring rolls, journal members for the ends of the shaft, and means for adjusting said journal members for adjusting the depth of cut of the cutting rings.

6. Breaking apparatus constructed in accordance with claim 3 in combination with a shaft for the uppermost of the superimposed scoring rolls, journal members for the ends of the shaft, means for adjusting said journal members for adjusting the depth of cut of the cutting rings, a frame for said journal boxes, latch members carried by said frame, a pair of superimposed feed rollers at each side of the frame and means for rotating the same, pivoted carriers for the uppermost feed rollers, and latch members on said pivoted carriers and adapted for coaction with the first named latch members to hold the uppermost feed rollers in raised position.

7. Breaking apparatus for chewing gum slabs, constructed in accordance with claim 3, in which the second feed means consists of a first set of chains, a second set of chains running overhead the first set for a shorter length, a carrier for the second set of chains, a support upon which said carrier is hinged so as to be swung away from the first set of chains, sprockets and drive gears for said first set of chains, and sprockets and drive gears for the second set of chains, the latter gears adapted to mesh with drive gears for the first set of chains.

8. A breaking apparatus for chewing gum slabs comprising a frame, means on the frame for receiving and feeding chewing gum slabs endwise thereof, supporting means for a slab in its movement, a throat having a wall associated with said slab-supporting means, a breaker bar reciprocable in said throat and adjacent said wall, in combination with swinging hanger means for the breaker bar including a lever arm adapted to receive actuating impulses, spring means for retracting the swinging hanger means, breaker bar and lever arm, a carrier for the breaker bar and swinging hanger means and lever arm and spring means, and releasable means for latching said carrier upon the slab supporting means.

References Cited in the file of this patent

UNITED STATES PATENTS

| | | |
|---|---|---|
| 924,955 | Armstrong | June 15, 1909 |
| 1,771,734 | Penley | July 29, 1930 |
| 2,279,843 | Smith et al. | Apr. 14, 1942 |
| 2,652,788 | Schoppe | Sept. 22, 1953 |